US006330806B1

(12) United States Patent
Beaverson et al.

(10) Patent No.: US 6,330,806 B1
(45) Date of Patent: Dec. 18, 2001

(54) SYSTEM AND METHOD FOR CONTROLLING AN HVAC SYSTEM USING A FLASH MINI-CARD

(75) Inventors: Gregory K. Beaverson; Bart A. Smith, both of York, PA (US)

(73) Assignee: York International Corporation, York, PA (US)

( * ) Notice: Subject to any disclaimer, the term of this patent is extended or adjusted under 35 U.S.C. 154(b) by 0 days.

(21) Appl. No.: 09/513,456

(22) Filed: Mar. 3, 2000

(51) Int. Cl.$^7$ .................................................. F25D 17/02
(52) U.S. Cl. ............................. 62/201; 62/185; 62/298; 62/77; 236/51
(58) Field of Search .......................... 62/201, 185, 298, 62/230, 125, 126, 127, 129, 130, 77; 236/51, 94; 165/11.1; 700/17, 83

(56) References Cited

U.S. PATENT DOCUMENTS

| 4,071,745 | 1/1978 | Hall ..................................... 364/104 |
| 4,545,210 | * 10/1985 | Lord ......................................... 62/77 |
| 5,237,826 | * 8/1993 | Baldwin et al. ...................... 62/77 X |
| 5,299,432 | * 4/1994 | Nakae et al. ............................ 62/298 |
| 5,383,336 | * 1/1995 | Nishida et al. .................... 236/51 X |
| 5,506,768 | 4/1996 | Seem et al. .......................... 364/161 |
| 5,558,274 | 9/1996 | Ben-Aissa et al. .................... 236/13 |
| 5,621,662 | 4/1997 | Humpries et al. .................... 364/550 |

(List continued on next page.)

FOREIGN PATENT DOCUMENTS

| 198 06 771 A1 | * 9/1999 | (DE) . |
| 0 121 147 | * 10/1984 | (EP) . |
| 0 489 227 A2 | * 6/1992 | (EP) . |
| 0 536 793 A2 | * 4/1993 | (EP) . |
| 0 727 861 A1 | * 8/1996 | (EP) . |

OTHER PUBLICATIONS

Intel Corporation, "Miniature Card Specification," Release 1.1, pp. 1–70, Jul. 29, 1996.
Intel Corporation, "Miniature Card Specification," Mechanical Specification, pp. 1–14, Jul. 29, 1996.

Primary Examiner—Harry B. Tanner
(74) Attorney, Agent, or Firm—Finnegan, Henderson, Farabow, Garrett & Dunner, L.L.P.

(57) ABSTRACT

A heating, ventilation, and air-conditioning (HVAC) control system and method for controlling a device, a subsystem, and/or a process using a flash mini-card. Preferably, the present invention is directed to an HVAC control system and method for controlling a chiller and the devices and subsystems associated with the chiller using a flash mini-card. More preferably, the present invention obviates the need for the HVAC control system and method to use at least one of the following: a hard disk, a disk controller, a card reader, or a card controller. The method includes, for example, applying power to the HVAC control system, wherein the step of applying power initiates a boot-up of a processor associated with the HVAC control system; reading a default memory location, wherein the contents of the default memory location direct the processor to a Basic Input/Output System (BIOS) connected to the processor through a bus; configuring the processor associated with the HVAC control system by executing a set of BIOS instructions within the BIOS, wherein after the step of configuring, the processor reads a set of boot instructions that directs the processor to the flash mini-card containing a set of instructions; and performing at least one of the set of instructions contained within the flash mini-card to control the HVAC system using the HVAC control system.

42 Claims, 5 Drawing Sheets

U.S. PATENT DOCUMENTS

| | | | |
|---|---|---|---|
| 5,709,094 | 1/1998 | Ooyabu et al. | 62/126 |
| 5,751,948 | 5/1998 | Dolan et al. | 395/185.07 |
| 5,787,027 | 7/1998 | Dolan et al. | 364/505 |
| 5,805,443 | 9/1998 | Raffray et al. | 364/140 |
| 5,831,852 | 11/1998 | Cahill-O'Brien et al. | 364/188 |
| 5,887,145 * | 3/1999 | Harari et al. | 395/282 |
| 6,011,741 * | 1/2000 | Wallace et al. | 365/221 |
| 6,029,092 * | 2/2000 | Stein | 700/11 |

* cited by examiner

SYSTEM AND METHOD FOR CONTROLLING AN HVAC SYSTEM USING A FLASH MINI-CARD

BACKGROUND OF THE INVENTION

I. Field of Invention

The present invention is directed to a heating ventilation and air conditioning (hereinbelow HVAC) control system and method for controlling a device, a subsystem, and/or a process using a flash mini-card and, more particularly, relates to an HVAC control system and method for controlling a chiller using a flash mini-card.

II. Description of the Related Art

HVAC control systems generally use non-volatile storage to store instructions that control the device or process under the control of the control system. Traditional HVAC control systems use a hard drive with a hard drive controller to provide non-volatile storage for the instructions that control the device or process under the control of the HVAC control system. More recently, non-volatile storage devices such as the Personal Computer Memory Card International Association (PCMCIA) card (hereinafter "PC Card") and the smart card serve as non-volatile storage for such control systems.

The PC Card is a credit card sized device that is frequently used as an auxiliary memory or an auxiliary input and output device (e.g., a modem card) in notebook computers. When the PC Card is used as a non-volatile storage device, the processor of the control system interacts with a PC Card controller that retrieves instructions from the PC Card.

A smart card is a plastic card about the size of a credit card with a microchip embedded within the plastic card. The smart card can be loaded with information for use by a processor associated with the control system to provide non-volatile storage. Unlike a magnetic stripe card that holds a small amount of information on a magnetic stripe, a smart card contains a larger amount of information including, for example, application programs. As with the magnetic strip cards, a smart card requires a reader such as card reader when used with a control system.

During boot-up, a processor associated with a control system may use a basic input/output system (BIOS) to support the initial configuration of the processor. BIOS is a program the processor uses to get the computer system started after initial power-up. BIOS resides in non-volatile storage such as an EPROM. Further, BIOS manages data flow between the computer's operating system and attached devices such as the hard disk, keyboard, mouse, and printer.

SUMMARY OF THE INVENTION

The present invention is directed to an HVAC control system and method for controlling a device, a subsystem, and/or a process associated with an HVAC system using a flash mini-card. More preferably, the present invention is directed to an HVAC control system and method for controlling a chiller using a flash mini-card.

An object of the present invention is to provide an improved HVAC control system and method that overcomes or minimizes one or more of the limitations and disadvantages of the presently available HVAC control systems and methods for controlling HVAC systems. Among other things, the invention reduces the number of components and cost associated with controlling a device, a subsystem, and/or a process associated with an HVAC system by using a flash mini-card to eliminate the need for a disk drive, disk drive controller, card reader, and/or card controller; permit software updates with the replacement of a flash mini-card; simplifies field upgrades of software with either a flash mini-card replacement or a network download of software; eliminate the need for a plurality of non-volatile storage devices (e.g., a plurality of EPROMS) to provide high density storage for large control programs; and implement a controller architecture that permits a processor to directly boot and directly execute control software from a single, readily replaceable storage device. More preferably, the present invention provides an HVAC control system and method for controlling, for example, a chiller associated with an HVAC system using a flash mini-card to store the instructions for controlling the chiller.

Additional features and advantages of the invention will be set forth in part in the description which follows and in part will be obvious from the description, or may be learned by practice of the invention. The objectives and advantages of the invention may be realized and attained by the system and method particularly pointed out in the written description and claims hereof as well as the appended drawings.

To achieve these and other advantages and in accordance with the purpose of the invention, as embodied and broadly described herein, there is provided a method of controlling a heating, ventilation, and/or air conditioning (HVAC) system using a HVAC control system. The method includes, for example, applying power to the HVAC control system, wherein the step of applying power initiates a boot-up of a processor associated with the HVAC control system; reading a default memory location, wherein the contents of the default memory location direct the processor to a Basic Input/Output System (BIOS) connected to the processor through a bus; configuring the processor associated with the HVAC control system by executing a set of BIOS instructions within the BIOS, wherein after the step of configuring, the processor reads a set of boot instructions that directs the processor to the flash mini-card containing a set of instructions; and performing at least one of the set of instructions contained within the flash mini-card to control the HVAC system using the HVAC control system.

In another embodiment of the present invention, there is provided a heating, ventilation, and air conditioning (HVAC) control system for controlling an HVAC system. The HVAC control system includes, for example, a processor, wherein when the HVAC control system is initially powered, the processor reads a default memory location within the processor, and wherein the contents of the default memory location direct the processor to a Basic Input/Output System (BIOS) Erasable Programmable Read Only Memory (EPROM) associated with the control system; a flash mini-card connected to the processor through a bus, wherein the flash mini-card contains a set of instructions, and wherein the processor executes at least one of the set of instructions contained within the flash mini-card to control the HVAC system; and means for configuring the processor associated with the HVAC control system by executing a set of BIOS instructions within the BIOS EPROM, wherein after executing the set of BIOS instructions within the BIOS EPROM, the processor reads a set of boot instructions that directs the processor to the flash mini-card that contains the set of instructions.

In yet another embodiment of the present invention, there is provided a method of controlling a chiller with a heating, ventilation, and air conditioning (HVAC) control system. The method includes, for example, configuring a processor associated with the HVAC control system by executing a set of Basic Input/Output System (BIOS) instructions within the BIOS Erasable Programmable Read Only Memory (EPROM); reading a set of boot instructions that directs the processor to the flash mini-card containing a set of instructions, after the step of configuring; and performing at least one of the set of instructions contained within the flash mini-card to control the chiller.

In still another embodiment of the present invention, there is provided a heating, ventilation, and air conditioning (HVAC) control system for a chiller. The HVAC control system includes, for example, a processor for configuring the HVAC control system by executing a set of Basic Input/Output System (BIOS) instructions within the BIOS Erasable Programmable Read Only Memory (EPROM); and means for reading a set of boot instructions that directs the processor to the flash mini-card containing a set of instructions, wherein the processor performs at least one of the set of instructions contained within the flash mini-card to control the chiller.

It is to be understood that both the foregoing general description and the following detailed description are exemplary and explanatory only and are not restrictive of the invention, as described.

BRIEF DESCRIPTION OF THE DRAWINGS

The accompanying drawings, which are incorporated in and constitute a part of this specification, illustrate an embodiment of the invention and, together with the description, serve to explain the objects, advantages and principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Generally, the present invention is directed to an HVAC control system and method for controlling a device, a subsystem, and/or a process associated with an HVAC system using a flash mini-card, and relates, more preferably, to an HVAC control system and method for controlling a chiller using a flash mini-card.

The flash mini-card (also referred to as the "Miniature Card") measures 38 mm (width)×33 mm (length)×3.5 mm (height). Unlike the PC card, the flash mini-card is about a quarter of the size of a PC card; implements a pinless connector that is well suited for harsh environments and consumer usage; and includes embedded algorithms that facilitate reading and writing to the flash mini-card. Preferably, the flash mini-card complies with the Miniature Card Reference Specification, Release 1.1, which is incorporated herein by reference.

Figure 1:
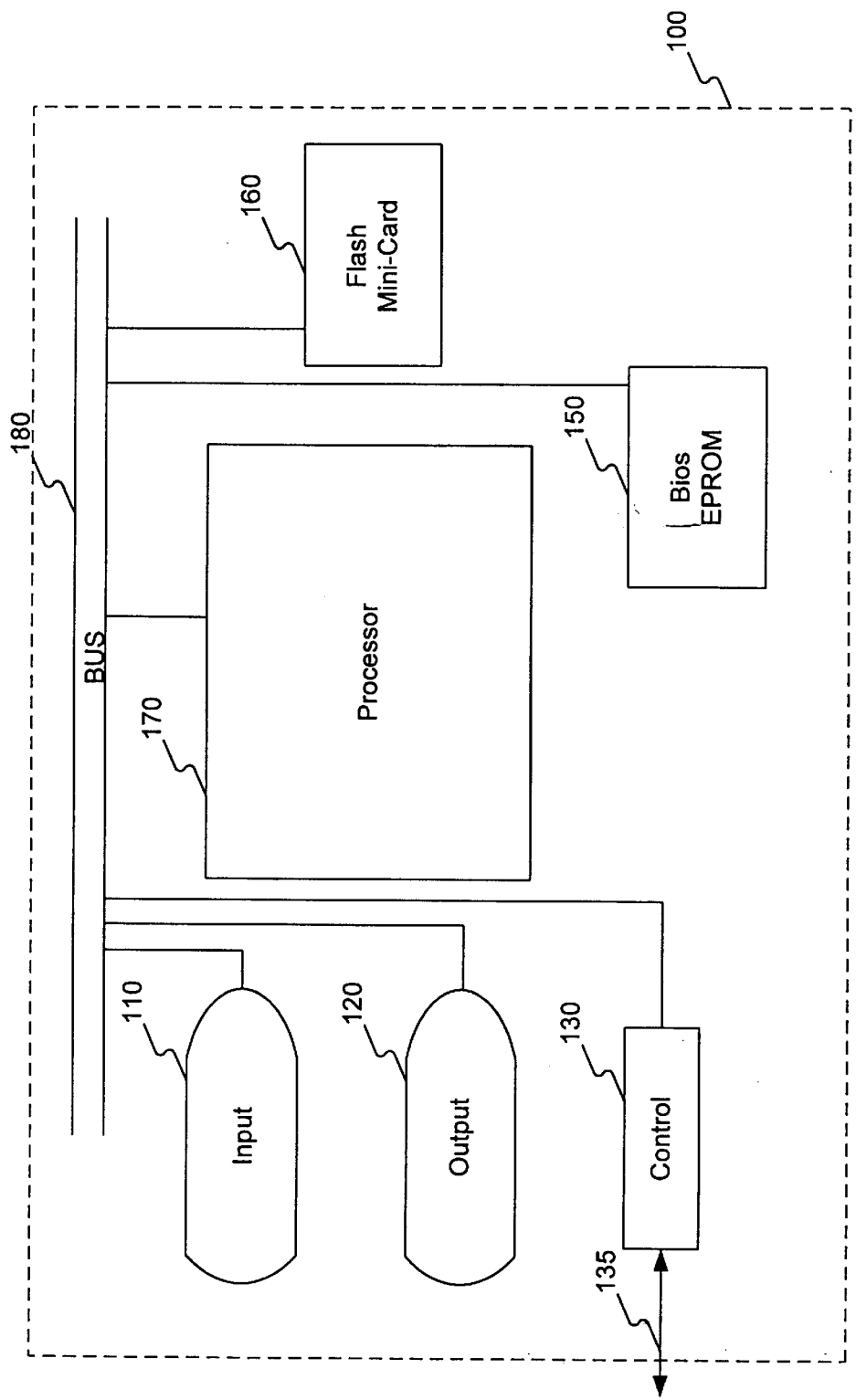
FIG. 1 illustrates, in general block diagram form, an exemplary HVAC control system using a flash mini-card, constructed in accordance with the present invention.

FIG. 1 illustrates, in general block diagram form, an exemplary HVAC control system 100 capable of performing the steps of controlling a device, a subsystem, and/or a process associated with an HVAC system using a flash mini-card, constructed in accordance with the present invention. Such devices, subsystems, and/or a processes associated with an HVAC system include, for example, operating chillers, operating heating coils, providing air flow and ventilation, controlling motors, and/or other devices, subsystems, and/or a processes found within an HVAC system. As shown in FIG. 1, the HVAC control system 100 includes an input module 110, an output module 120, a BIOS EPROM 150, a bus 180, a flash mini-card 160, and a processor 170.

The input module 110 of FIG. 1 may be implemented with a variety of systems, subsystems, and/or devices capable of receiving information that may assist in performing the steps of controlling., Some of these devices include, for example, a thermostat, a temperature sensor, a pressure sensor, a keyboard, a mouse, and/or a touch screen.

The output module 120 may be implemented with a variety of systems, subsystems, and/or devices capable of providing an output including, for example, a printer, a display, a cathode ray tube, a liquid crystal display, a parallel interface, a serial interface, a network interface, one or more switches, one or more relays, one or more stepper motors, one or more actuators, and/or one or more valves.

The control module 130 may be implemented with a variety of systems, subsystems, and/or devices capable of providing control signals for controlling the HVAC system including, for example, a parallel interface, a serial interface, and/or a network interface. The control module 130 includes a control data pathway 135 that permits the exchange of control data. The control data pathway 135 may include, for example, a twisted pair, an optical cable, and/or a multi-pin control cable (e.g., IEEE 488 bus cable).

In a preferred embodiment, the Basic Input/Output System (BIOS) resides within the BIOS Erasable Programmable Read-Only Memory (EPROM) 150. More preferable, the BIOS EPROM includes an EPROM integrated circuit that stores the BIOS for configuring the processor 170 connected to the BIOS EPROM 150 through the bus 180. The BIOS may, however, be contained within any device capable of providing non-volatile storage including, for example, the flash mini-card 160.

The bus 180 provides an information pathway for the HVAC control system 100. By way of non-limiting example, in an exemplary embodiment, the bus 180 permitted information (e.g., address, control, and data) to be exchanged within the HVAC control system 100. More particularly, the bus 180 included, for example, an address bus, a control bus, and a 32 bit local data bus, and a 16 bit data bus.

The flash mini-card 160 may be implemented with a variety of storage devices, capable of containing an embedded program and/or an embedded erase algorithm such as storage devices compatible with the Miniature Card Specification. More particularly, the flash mini-card 160 may be implemented with, for example, the Sharp® Flash Miniature Card or the Centennial Technologies Miniature Card Compliant Flash Storage.

The processor 170 of FIG. 1 may be implemented with a variety of systems, subsystems, and/or devices capable of processing the instructions corresponding to the method of the present invention. FIG. 1 only illustrates a single processor 170 for the HVAC control system 100, which is the preferred embodiment, for purposes of economy, efficiency, and space. It is possible, however, to use a set of processors without departing from the spirit of the present invention. Similarly, in certain applications, the processor 170 may also include, for example, one or more of the following additional components (not shown): one or more central processing units, a co-processor, a memory, a set of registers, and other data processing devices and systems as appropriate.

Further, the HVAC control system 100 and/or any of the above modules, devices, components, subsystems, systems, or functions of the invention may be embodied in any suitable combination of hardware, software, or firmware and may be embodied as a separate system, incorporated into another device, or embedded within one or more boards and/or one or more integrated circuits. By way of non-limiting example, the processor 170, BIOS EPROM 150, and/or control module 130 may be incorporated into an integrated circuit (e.g., an application specific integrated circuit). When the integrated circuit incorporates, for example, the processor 170 and BIOS EPROM 150, the flash mini-card 160 provides the sole means of non-volatile storage for the instructions controlling the HVAC system, which is a preferred embodiment for purposes of economy, efficiency, and space.

Figure 2:
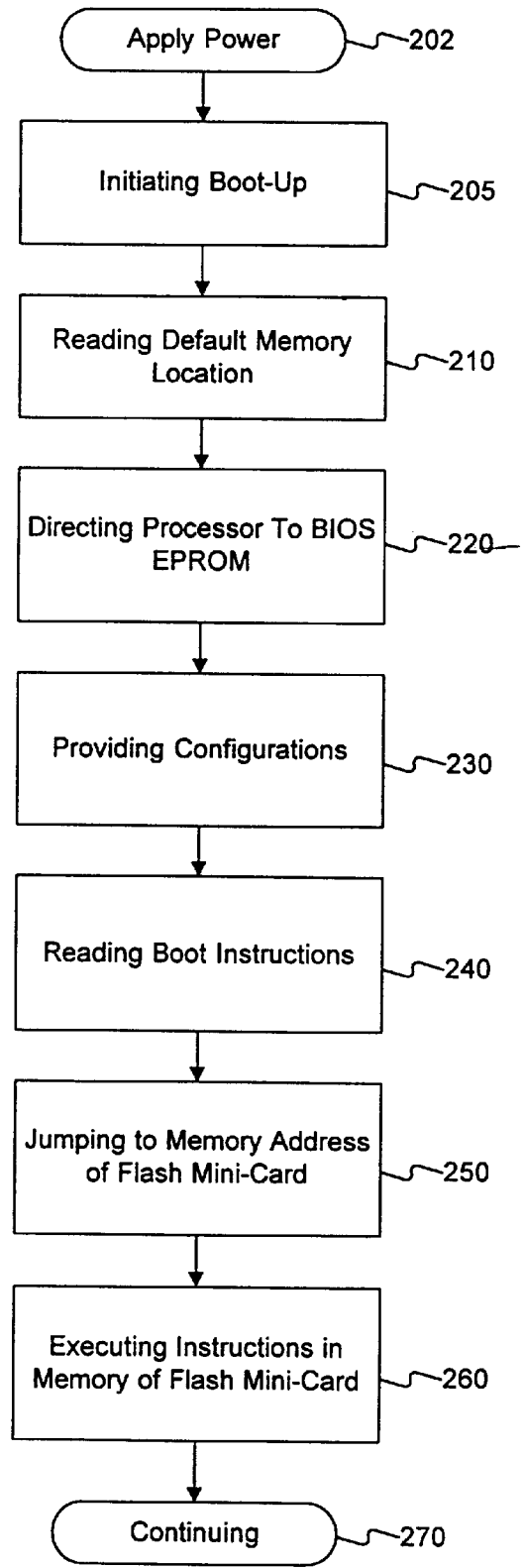
FIG. 2 is an exemplary flowchart depicting steps associated with an HVAC control system using a flash mini-card, in accordance with the present invention.

FIG. 2 is an exemplary flowchart depicting steps 200 associated with controlling a device, a subsystem, and/or a process associated with an HVAC system using a flash mini-card, in accordance with the present invention. Although the HVAC control system 100 can be used to control a variety of devices, subsystems, and or processes associated with an HVAC system, the following embodiments will be illustrated by reference to a chiller such as those found in the HVAC industry. Referring to FIG. 2, a user or a system (not shown) begins the steps 200 of FIG. 2 by applying power (step 202) to the HVAC control system 100. The step of applying power initiates a boot-up (step 205) of the processor 170 associated with the HVAC control system 100. The processor 170 reads a default memory location (step 210) that directs (step 220) the processor 170 to the BIOS EPROM 150 connected to the processor 170 through the bus 180. The BIOS EPROM 150 configures (step 230) the processor 170 associated with the HVAC control system 100 by executing a set of BIOS instructions within the BIOS EPROM 150. The processor 170 then reads a set of boot instructions (step 240); jumps (step 250) to the flash mini-card 160 containing a set of instructions; performs (step 260) at least one of the set of instructions contained within the flash mini-card to control, for example, the chiller; and continues performing at least one of the instructions until the instructions indicate that a termination is appropriate (step 270).

In an embodiment where the invention is used to control an HVAC system, such as a chiller, the inputs to the system may include, by way of example, a thermostat, temperature sensors, flow sensors, pressure sensors, position sensors, and so forth. These sensed values are periodically sensed and applied to algorithms in the software, according to a program or programs installed in the flash mini-card. The system then provides output signals that control other aspects of the HVAC system, such as valves, pumps, fans, compressors, chillers, condensor, and similar HVAC equipment.

To apply power (step 202), a user powers-up the HVAC control system 100 by using, for example, the input module 110. Alternatively, another system, subsystem, or device initiates power-up of the HVAC control system 100. More preferably, an HVAC system initiates power-up of the HVAC control system 100 in response to a demand for cooling or heating by a thermostat (not shown).

When the processor 170 associated with the HVAC control system 100 senses power, the processor 170 automatically initiates a boot-up sequence (step 205) that, among other things, configures the processor 170 and/or senses for the presence of other components, devices, subsystems, and systems associated with the HVAC control system 100.

During boot-up, the processor 170 reads a default memory location (step 210). Preferably, this default memory location is hard coded within the processor 170 and directs the processor 170 (step 220) to the BIOS EPROM 150 connected to the processor 170 through a bus 180. This default memory location is also referred to as the boot vector.

To configure (step 230) the processor 170, the BIOS EPROM 150 executes a set of BIOS instructions within the BIOS EPROM 150. The set of BIOS instructions determines whether all of the devices and subsystems associated with the HVAC control system 100 are present (i.e., connected to the bus 180) and operational. In addition, the BIOS EPROM 150 configures the processor 170 by using the set of BIOS instruction and by loading some of the contents of the BIOS EPROM into the processor 170, random access memory (not shown) associated with the processor 170, and/or, the flash mini-card 160.

During the step of configuring (step 230), the BIOS EPROM 150 provides the processor 170 with the memory address to the flash mini-card 160. As a result, the processor 170 reads the memory address of the flash mini-card 160 and executes a jump instruction (step 250) directly to the flash mini-card 160, which contains, inter alia, a set of instructions for controlling the device, subsystem, and/or process associated with the HVAC system (e.g., a chiller).

To perform (step 260) the at least one of the set of instructions contained within the flash mini-card 160, the processor 170 reads at least one of the set of instructions contained within the flash mini-card 160. The set of instructions within the flash mini-card 160 includes, for example, instructions for further configuring the HVAC control system 100, instructions for controlling using the HVAC control system 100, and/or instructions for controlling an HVAC system (e.g., a chiller) using the HVAC control system 100.

The processor 170 continues performing the at least one of the set of instructions until at least one of the set of instructions indicates that a termination is appropriate (step 270). Alternatively, when the processor 170 continues performing the set of instructions (step 270), the input module 110 (e.g., a thermostat) may be used to terminate the processing of the set of instruction prior to performing a terminate instruction from within the set of instructions.

Moreover, the control module 130 preferably exchanges control information with the device, subsystem, and/or process being controlled through the control data pathway 135. By way of non-limiting example, the control module 130 preferably exchanges control information with the chiller (e.g., chiller water temperature) associated with an HVAC system through the control data pathway 135.

In view of the foregoing, the HVAC control system 100 and steps 200 of the present invention minimize the number of components associated with controlling a device, subsystem, and/or process associated with an HVAC system by using a flash mini-card 160. Since the processor 170 uses only the flash mini-card 160, the use of the flash mini-card 160 obviates the need for non-volatile storage devices and associated devices including, for example, a disk drive, a disk drive controller, a card reader, and/or a card controller. Furthermore, the flash mini-card facilitates software updates by merely replacing the flash mini-card 160 with another flash mini-card that contains the updated software. In fact, the ease of updating software is particularly important when upgrading or replacing software in harsh field conditions, which is common in HVAC environments and applications such as when the HVAC control system is placed adjacent to the chiller.

Figure 3:
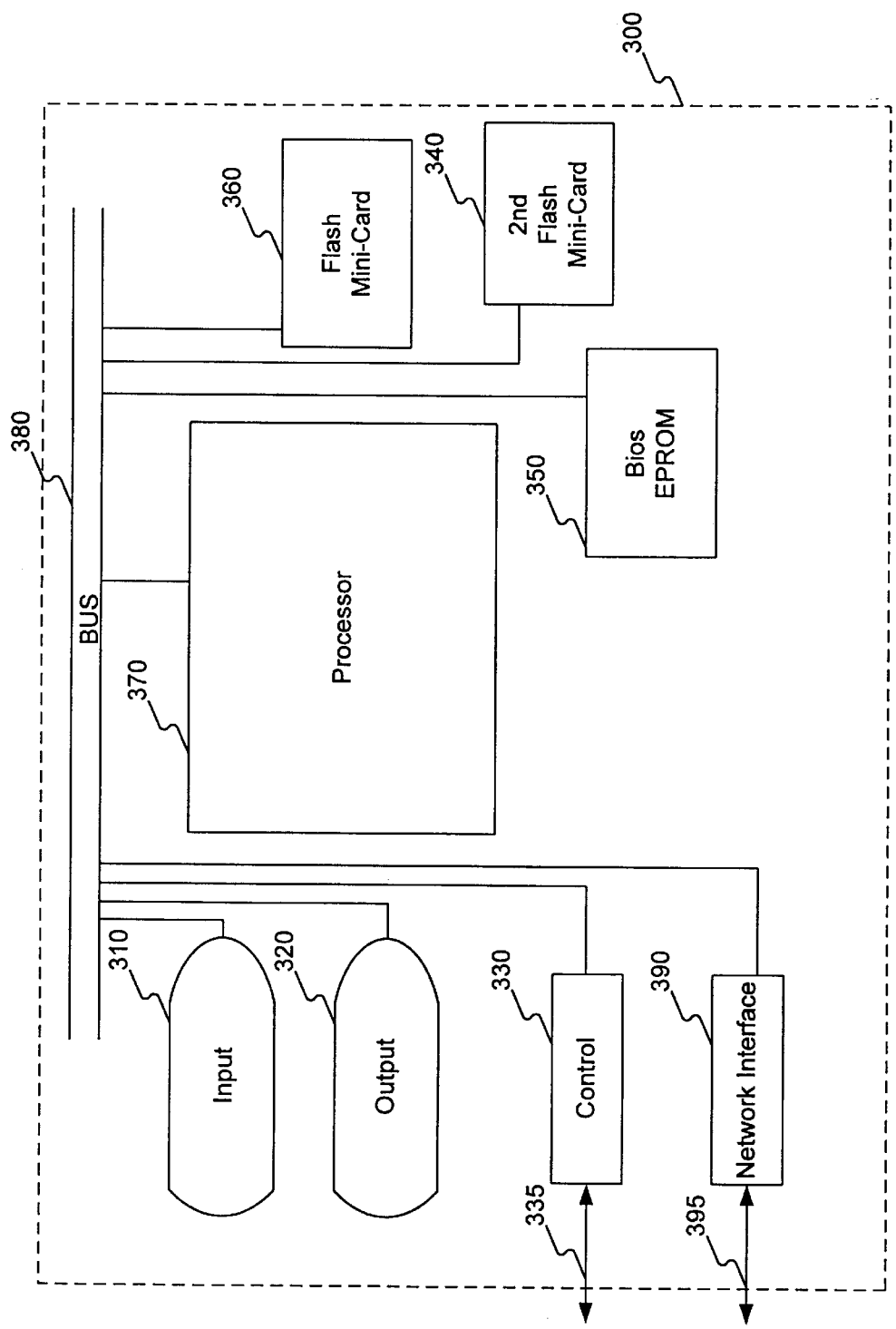
FIG. 3 illustrates, in general block diagram form, another exemplary HVAC control system for controlling an HVAC system using a flash mini-card, constructed in accordance with the present invention.

FIG. 3 illustrates, in general block diagram form, another exemplary HVAC control system 300 capable of performing the steps of controlling a device, a subsystem, and/or a process associated with an HVAC system using a plurality of flash mini-cards, constructed in accordance with the present invention. As shown in FIG. 3, the HVAC control system 300 includes an input module 310, an output module 320, a control module 330, a control data pathway 335, a network interface 390, a network pathway 395, a BIOS EPROM 350, a bus 380, a flash mini-card 360, a second flash mini-card 340, and a processor 370.

The input module 310 of FIG. 3 may be implemented with a variety of systems, subsystems, and/or devices capable of receiving information that may assist in performing the steps of controlling. Some of these devices include, for example, a thermostat, a temperature sensor, a pressure sensor, a current sensor, a voltage sensor, a keyboard, a mouse, and/or a touch screen.

The output module 320 may be implemented with a variety of systems, subsystems, and/or devices capable of providing an output including, for example, a printer, a display, a cathode ray tube, a liquid crystal display, a parallel interface, a serial interface, a network interface, one or more switches, one or more relays, one or more stepper motors, one or more actuators, and/or one or more valves. The control module 330 may be implemented with a variety of systems, subsystems, and/or devices capable of providing control signals for controlling an HVAC system including, for example, a parallel interface, a serial interface, and/or a network interface. Furthermore, the control module 330 includes a control data pathway 335 that permits the exchange of control data. The control data pathway 335 may include, for example, a twisted pair, an optical cable, and/or a multi-pin control cable (e.g., IEEE 488 bus cable). More preferably, the control module 330 includes a Field Programmable Gate Array (FPGA) (not shown) that reduces the number of components necessary to provide control signals to the HVAC system by providing software programmable configurations, which provide a variety of control signals.

The BIOS EPROM 350 includes an EPROM integrated circuit that contains the BIOS for configuring the processor 370 connected to the BIOS EPROM 350 through the bus 380. More preferably, the BIOS for configuring the processor 370 is pre-loaded on the EPROM. Although this embodiment utilizes BIOS EPROM 350, the memory and BIOS software of the BIOS EPROM 350 may be incorporated into the flash mini-card 360, which further reduces the number of components required to control the HVAC system.

The bus 380 provides an information pathway for the control system 300. By way of non-limiting example, in the exemplary embodiment, the bus 380 permits information (e.g., address, control, and data) to be exchanged within the HVAC control system 300. More particularly, the bus 380 includes, for example, an address bus, a control bus, a 32 bit local data bus, and a 16 bit data bus.

The processor 370 of FIG. 3 may be implemented with a variety of systems, subsystems, and/or devices capable of processing the instructions corresponding to the method of the present invention. FIG. 3 only illustrates a single processor 370 for HVAC control system 300, which is the preferred embodiment. It is also possible to use a set of processors without departing from the broad spirit of the present invention. Furthermore, the processor 370 may also include, for example, one or more of the following additional components (not shown): one or more central processing units, a co-processor, a memory, a set of registers, a FPGA, and other data processing devices and systems as appropriate, when space and economy permit.

The flash mini-card 360 and the second flash mini-card 340 may be implemented with a variety of storage devices including, for example, storage devices capable of containing an embedded program and/or an embedded erase algorithm, and/or storage devices compatible with the Miniature Card Specification. More particularly, the flash mini-card 360 and the second flash mini-card 340 may be implemented with, for example, the Sharp® Flash Miniature Card or the Centennial Technologies Miniature Card Compliant Flash Storage. Although two flash mini-cards are shown in FIG. 3, additional flash mini-cards may be used to provide additional storage without departing from the spirit of the present invention. By way of non-limiting example, the use of more than one flash mini-card enables the HVAC control system 300 to provide additional storage for storing the set of instructions for controlling. Further, the use of more than one flash mini-card enables the HVAC control system 300 to download and update control software into one flash mini-card while controlling, for example, the chiller using the set of instructions stored within another flash mini-card.

Figure 5:
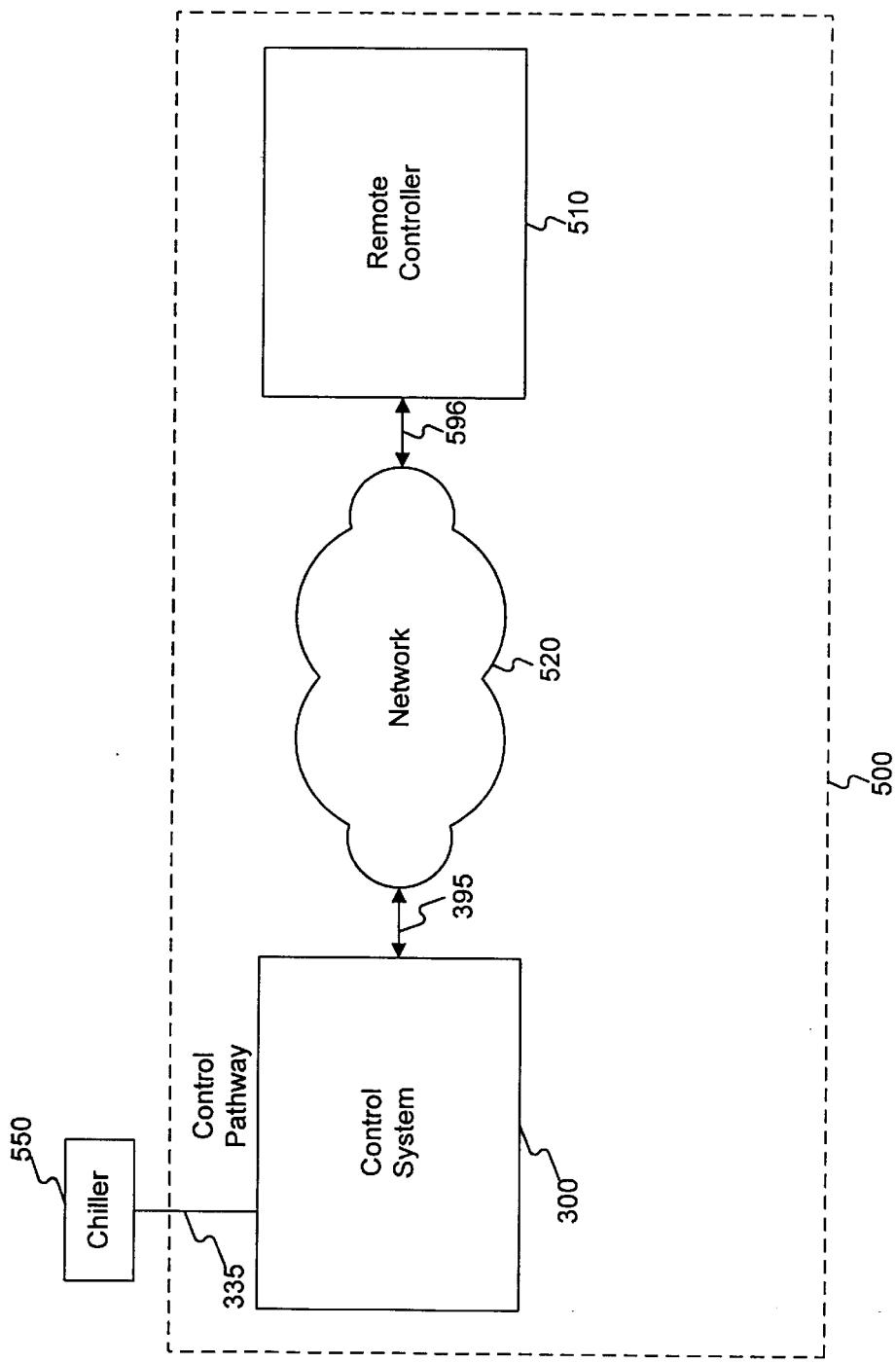
FIG. 5 illustrates, in general block diagram form, another embodiment of the present invention for controlling a chiller with an HVAC control system using a flash mini-card, constructed in accordance with the present invention.

The network interface 390 may be implemented with a variety of devices capable of providing an interface between the processor 370 and a network (see, e.g., network 520 at FIG. 5). More preferably, the network interface 390 permits connection to at least one of the following networks: an Ethernet network, an Internet Protocol network, a telephone network, a cellular network, and a radio network. Yet more preferably, the network interface 390 provides a network pathway 395 that physically connects the network interface 390 to the network and includes, for example, twisted pair, optical cable, multi-pin cables, transceivers, buffers, repeaters, network protocols, and/or other systems necessary to exchange information over the network.

Further, the HVAC control system 300 and/or any of the above modules, devices, components, subsystems, systems, or functions of the invention may be embodied in any suitable combination of hardware, software, or firmware and may be embodied as a separate system, incorporated into another device, or embedded within one or more boards and/or one or more integrated circuits. By way of non-limiting example, the processor 370, BIOS EPROM 350, network interface 390, output module 320, input module, 310, and/or control module 330 may be incorporated into an integrated circuit (e.g., an application specific integrated circuit). When the integrated circuit incorporates, for example, the processor 370 and the BIOS EPROM 350, the flash mini-card 360 may provide the sole means of storage for the instructions controlling the HVAC system, which is a preferred embodiment for purposes of economy, efficiency, and space.

Figure 4:
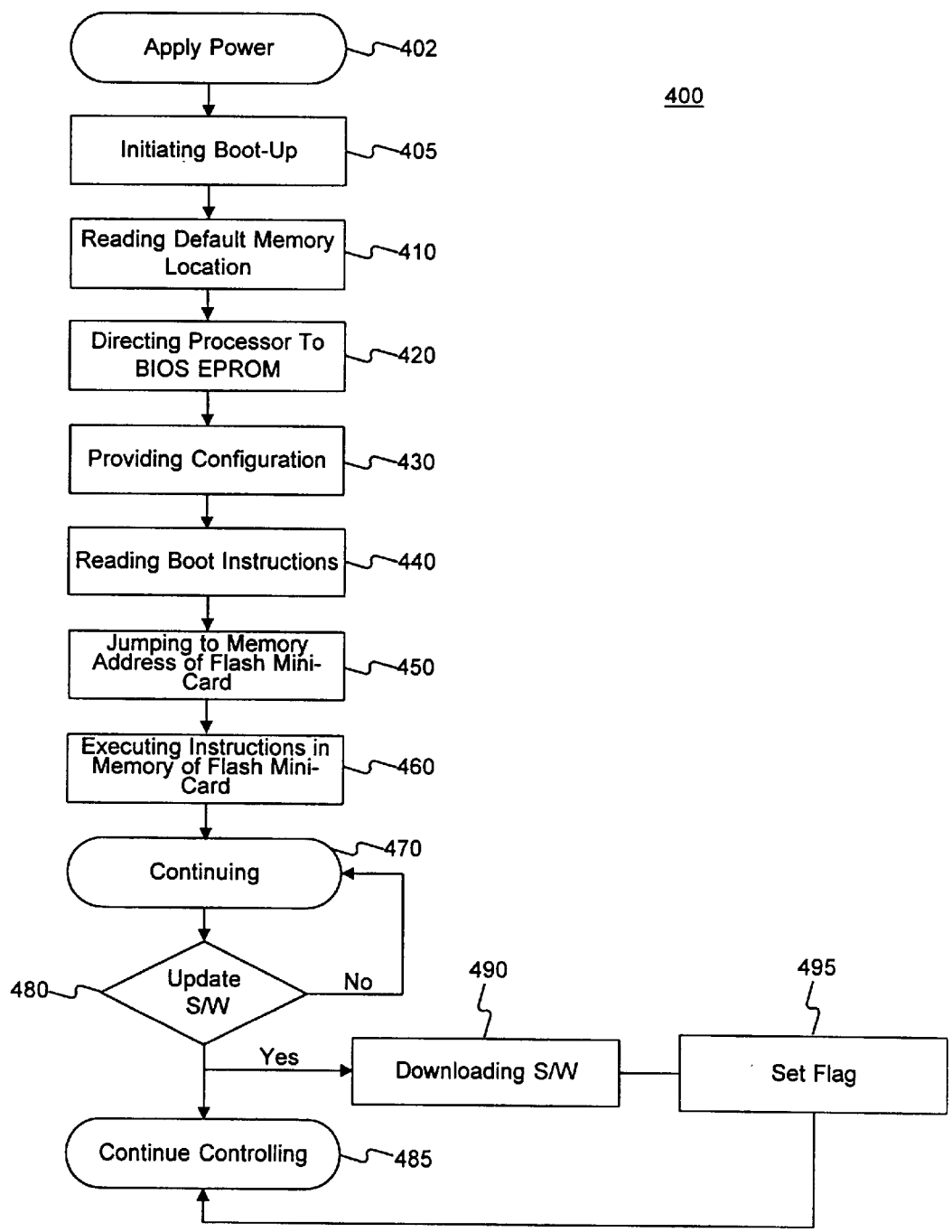
FIG. 4 is another exemplary flowchart depicting steps associated with an HVAC control system using a flash mini-card, in accordance with the present invention.

FIG. 4 is an exemplary flowchart depicting steps 400 associated with controlling a device, a subsystem, and/or a process associated with an HVAC system using a flash mini-card, in accordance with the present invention. Referring to FIG. 4, the present embodiment will be illustrated with an example of controlling an HVAC system that includes a chiller, even though the present invention can be used to control a variety of devices, subsystems, and/or processes associated with an HVAC system.

Referring to FIG. 4, a user or a system begins the steps 400 of FIG. 4 by applying power (step 402) to the HVAC control system 300. The step of applying power initiates a boot-up (step 405) of the processor 370 associated with the HVAC control system 300. The processor 370 reads a default memory location (step 410) that directs (step 420) the processor 370 to the BIOS EPROM 350 connected to the processor 370 through the bus 380. The BIOS EPROM 350 configures (step 430) the processor 370 associated with the HVAC control system 300 by executing a set of BIOS instructions within the BIOS EPROM 350. The processor 370 then reads a first set of boot instructions (step 440); jumps (step 450) to the flash mini-card 360 containing a first set of instructions; performs (step 460) the first set of instructions contained within the flash mini-card to control, for example, the chiller; and continues performing the first set of instructions until the first set of instructions indicates that a termination is appropriate (step 470).

While the processor 370 performs the at least one of the first set of instructions (step 470), the HVAC control system 300 determines whether a software update is requested (step 480); if a software update is not requested (no at step 480) the HVAC control system 300 returns to step 470. If a software update is requested (yes at step 480), the HVAC control system 300 continues (step 485) controlling the chiller; downloads (step 490) a second set of instructions for controlling the chiller; sets a flag (step 495) indicating that the second set of instructions is received and available for use by the processor 370; and continues controlling (step 485) the chiller using the first set of instructions. Preferably, the processor 370 waits until an appropriate time before utilizing the second set of instructions to control the chiller. More preferably, the processor 370 begins using the second set of instructions after a reboot of the processor 370. Further, the HVAC control system 300 preferably performs the steps associated with downloading a second set of instructions (steps 490–495) without interrupting the control of the chiller.

To apply power (step 402), a user powers-up the HVAC control system 300 by using, for example, the input module 310. Alternatively, another system, subsystem, or device initiates power-up of the HVAC control system 300. More preferably, an HVAC system initiates power-up of the HVAC control system 300 in response to a demand for cooling or heating (e.g., by a thermostat).

When the processor 370 associated with the HVAC control system 300 senses power, the processor 370 automatically initiates a boot-up sequence (step 405) that, among other things, configures the processor 370 and/or senses for the presence of other components, devices, and subsystems associated with the HVAC control system 300.

During boot-up, the processor 370 reads a default memory location (step 410). Preferably, this default memory location is hard coded within the processor 370 and directs the processor 370 (step 420) to the BIOS EPROM 350 connected to the processor 370 through a bus 380. This default memory location is also referred to as the boot vector.

To configure (step 430) the processor 370, the BIOS EPROM 350 executes a set of BIOS instructions within the BIOS EPROM 350. The set of BIOS instructions determines whether all of the devices and subsystems associated with the HVAC control system 300 are present (i.e., connected to the bus 380) and operational.

During the step of configuring (step 430), the BIOS EPROM 350 provides the processor 370 with the memory address to the flash mini-card 360. As a result, the processor 370 reads the memory address of the flash mini-card 360 and executes a jump instruction (step 450) directly to the flash mini-card 360, which contains, inter alia, a first set of instructions for controlling the chiller.

To perform (step 460) the at least one of the set of instructions contained within the flash mini-card 360, the processor 370 reads at least one of the first set of instructions contained within the flash mini-card 360. The first set of instructions within the flash mini-card 360 includes, for example, instructions for further configuring the HVAC control system 300, instructions for controlling a device, subsystem, and/or process associated with an HVAC system using the HVAC control system 300, and/or instructions for controlling the chiller using the HVAC control system 300. More preferably, the control module 330 exchanges control information (e.g., control signals) with the chiller being controlled through the control data pathway 335.

The processor 370 continues performing the at least one of the first set of instructions until at least one of the first set of instructions indicates that a termination is appropriate (step 470). Alternatively, when the processor 370 continues performing the first set of instructions (step 470), the input module 310 (e.g., a thermostat) may be used to terminate the processing of the first set of instructions prior to receiving a terminate instruction.

While the processor 370 performs the at least one of the first set of instructions (step 470), the HVAC control system 300 determines whether a software update is requested (step 480). To determine whether a software update is requested (step 480), the HVAC control system 300 may receive a request from a user through the input module 310. Similarly, the HVAC control system 300 may receive a request from another system through the input module 310 or through the network interface 390 indicating that a software update is required.

If a software update is not requested (no at step 480), the HVAC control system 300 returns to step 470. If a software update of the first set of instructions is requested (yes at step 480), the HVAC control system 300 begins downloading to the second mini-card 340 (step 490) a second set of instructions for controlling the chiller. Further, while the HVAC system 300 is downloading (step 490), the HVAC system 300 continues (step 485) to control the chiller with the first set of instructions stored in the flash mini-card 360.

To download (step 490) a second set of instructions for controlling the chiller, the processor 370 retrieves the second set of instructions through the network interface 390 from, for example, a system capable of providing software through a network (e.g., the network 520 of FIG. 5). The processor 370 stores the second set of instructions in the second flash mini-card 340.

Once the second set of instructions is stored in the second flash mini-card 340, the processor 370 sets a flag (step 495) indicating that the second set of instructions is stored in the second flash mini-card. The flag permits the HVAC control system 300 to perform the second set of instructions at an appropriate time including, for example, during the next start-up of the HVAC control system 300 or when requested. Until such time, the processor 370 continues to perform the first set of instructions (step 485).

Accordingly, in addition to permitting software updates with the replacement of a flash mini-card, the present invention further simplifies the field upgrades of software in the harsh environment typically encountered in HVAC applications by enabling software update through a network. Further, the present invention avoids interrupting the control of the device, subsystem, or process being controlled during such replacement or update.

FIG. 5 illustrates, in general block diagram form, yet another embodiment of the present invention for remotely controlling a device, subsystem, and/or process associated with an HVAC system, constructed in accordance with the present invention. Referring to FIG. 5, the system 500 includes a remote controller 510, a network connection 395, a network 520, a second network connection 596, an HVAC control system 300, a control connection 335, and a chiller 550.

The remote controller 510 and the HVAC control system 300 may be implemented with the HVAC control system 300 of FIG. 3. Alternatively, the remote controller 510 may include only the components necessary to remotely control the HVAC control system 300. In yet another alternative implementation, the remote controller 510 may be incorporated into a building automation system. The network connection 395 and the second network connection 596 are similar to the network connection 395 of FIG. 3. The network 520 may be implemented with at least one of the following networks: an Ethernet network, an Internet Protocol network, a telephone network, a cellular network, and a radio network. The control connection 335 is similar to the control connection 335 of FIG. 3 and permits the system 500 to control, for example, a chiller of an HVAC system using control signals.

The system 500 permits the remote controller 510 to remotely control the HVAC control system 300 through the network 520. By way of non-limiting example, a user may use the remote controller 510 to control a chiller located across the country. Similarly, the remote controller 510 may be used to remotely control a plurality of HVAC control systems 300 each connected to the remote controller 510 through the network 520. Moreover, the remote controller 510 may be used to provide updated software (e.g., the second set of instructions) to a plurality of HVAC control systems 300 each connected to the remote controller 510 through the network 520. Each of these HVAC control systems executes, for example, the steps illustrated in FIGS. 2 or 4.

Accordingly, the remote controller 510 remotely controls the chiller using a set of instructions stored within the flash mini-card. Furthermore, the use of the flash mini-card minimizes the number of components associated with controlling, for example, the chiller. Since remote controller 520 and HVAC control system 300 use only the flash mini-card for non-volatile storage of the set of instructions, the use of the flash mini-card obviates the need for at least one of the following: a disk drive, a disk drive controller, a card reader, and/or a card controller. Moreover, the flash mini-card facilitates software updates by merely replacing the flash mini-card with another flash mini-card with pre-loaded software; and facilitates the control of a plurality of devices, subsystems, and/or processes associated with an HVAC system by permitting a user to control such devices, subsystems, and/or processes from a single location.

In an embodiment of the present invention, the HVAC control system 300 controls the chiller 550 through the control data pathway 335. By way of non-limiting example, the HVAC control system 300 monitors a plurality of parameters associated with controlling the chiller including, inter alia, chiller water temperature, oil pressure, oil temperature, motor current, current load placed on the starter motor, and/or failure indications. Moreover, the HVAC control system 300 controls a plurality of devices and subsystems associated with the chiller including, inter alia, turning on and off solenoids, valves, and actuators; maintaining the output water temperature of the chiller at a temperature that is set using the HVAC control system; controlling oil systems and oil pumps; commanding the starter motor of the chiller; and/or varying the speed of the starter motor when the starter motor is a variable speed motor.

Although the HVAC control system 300 is capable of monitoring one parameter, the HVAC control system 300 is, preferably, capable of monitoring at least 14 parameters associated with, for example, the chiller. Furthermore, although the HVAC control system 300 is capable of controlling one device and subsystem, the HVAC control system is, preferably, capable of controlling, at least 12 devices or subsystems associated with the chiller.

Although the HVAC control system is described as a stand-alone controller, the HVAC control system 300 may be incorporated into other systems including, for example, a building automation system. The foregoing description of a preferred embodiments of the invention has been presented for purposes of illustration and description. It is not intended to be exhaustive or to limit the invention to the precise form disclosed, and modifications and variations are possible in light of the above teachings or may be acquired from practice of the invention. For example, the present invention is not limited to the system or method disclosed, but is capable of being embodied in a variety of ways and services. More particularly, although the aforementioned HVAC control system and method was illustrated by way of a chiller for an HVAC system, the HVAC control system and method of the present invention is applicable to the control of any device, subsystem, and/or process associated with the HVAC industry.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of controlling a heating, ventilation, and air conditioning (HVAC) system using a HVAC control system, comprising the steps of applying power to the HVAC control system, wherein said step of applying power initiates a boot-up of a processor associated with the HVAC control system;

reading a default memory location, wherein the contents of the default memory location direct the processor to a Basic Input/Output System (BIOS) connected to the processor through a bus;

configuring the processor associated with the HVAC control system by executing a set of BIOS instructions within the BIOS, wherein after said step of configuring, the processor reads a set of boot instructions that directs the processor to the flash mini-card containing a set of instructions; and performing at least one of the set of instructions contained within the flash mini-card to control the HVAC system using the HVAC control system.

2. The method of claim 1, wherein said BIOS resides in the flash mini-card.

3. The method of claim 1, wherein said performing further comprises not requiring the use of at least one of the following: a hard disk, a disk controller, a card reader, or a card controller.

4. The method of claim 1, wherein said configuring further comprises testing for the presence of a flash mini-card associated with the HVAC control system.

5. The method of claim 1, further comprising the step of:
remotely controlling the HVAC control system using a remote control system connected to the HVAC control system through a network.

6. The method of claim 1, further comprising the step of:
downloading from a network a second set of instructions, wherein a plurality of flash mini-cards connected to the processor permit said downloading of the second set of instructions to at least one of the plurality of flash mini-cards connected to the processor.

7. The method of claim 6, wherein the processor continues performing the set of instructions from the at least one of the plurality of flash mini-cards not receiving the second set of instructions from the network, during said downloading of the second set of instructions to at least one of the plurality of flash mini-cards connected to the processor.

8. The method of claim 7, further comprising updating said set of instructions.

9. A heating, ventilation, and air conditioning (HVAC) control system for controlling an HVAC system, comprising a processor, wherein when the HVAC control system is initially powered, said processor reads a default memory location within said processor, and wherein the contents of the default memory location direct said processor to a Basic Input/Output System (BIOS) Erasable Programmable Read Only Memory (EPROM) associated with the control system;
a flash mini-card connected to said processor through a bus, wherein the flash mini-card contains a set of instructions, and wherein said processor executes at least one of the set of instructions contained within said flash mini-card to control the HVAC system; and
means for configuring the processor associated with the HVAC control system by executing a set of BIOS instructions within the BIOS EPROM, wherein after executing the set of BIOS instructions within the BIOS EPROM, the processor reads a set of boot instructions that directs said processor to said flash mini-card that contains the set of instructions.

10. The HVAC control system of claim 9, wherein when said processor executes at least one of the set of instructions contained within said flash mini-card to control the HVAC system, said processor executes the at least one of the set of instructions without the use of at least one of the following devices: a hard disk, a disk controller, a card reader, or a card controller.

11. The HVAC control system of claim 9, wherein said means for configuring further comprises means for testing for the presence of a flash mini-card associated with the HVAC control system.

12. The HVAC control system of claim 9, further comprising a remote control system connected through a network, wherein the second control system remotely controls the HVAC control system through the network.

13. The HVAC control system of claim 9, further comprising a plurality of flash mini-cards.

14. The HVAC control system of claim 13, further comprising a network interface for downloading a second set of instructions from said network, wherein said processor permits at least one of the plurality of flash mini-cards to receive the second set of instructions.

15. The HVAC control system of claim 14, wherein said processor performs the set of instructions from at least one of the plurality of flash mini-cards not receiving instructions from said network, while the at least one of the plurality of flash mini-cards receives the second set of instructions.

16. The HVAC control system of claim 15, further comprising means for updating the set of instructions.

17. A method of controlling a chiller with a heating, ventilation, and air conditioning (HVAC) control system, comprising the steps of
configuring a processor associated with the HVAC control system by executing a set of Basic Input/Output System (BIOS) instructions within a BIOS;
reading a set of boot instructions that directs the processor to the flash mini-card containing a set of instructions, after said step of configuring; and
performing at least one of the set of instructions contained within the flash mini-card to control the chiller.

18. The method of claim 17, wherein said performing further comprises not requiring the use of at least one of the following devices: a hard disk, a disk controller, a card reader, or a card controller.

19. The method of claim 17, wherein said configuring further comprises testing for the presence of a flash mini-card associated with the HVAC control system, and wherein the BIOS is stored within the flash mini-card.

20. The method of claim 17, further comprising the step of:
remotely controlling the HVAC control system using a remote control system connected to the HVAC control system through a network.

21. The method of claim 17, further comprising the step of:
downloading from a network a second set of instructions to at least one of a plurality of flash mini-cards connected to the processor.

22. The method of claim 21, wherein during said downloading, the processor continues reading the set of instructions from the at least one of the plurality of flash mini-cards that is not receiving the second set of instructions from the network.

23. The method of claim 22, further comprising updating the set of instructions.

24. The method of claim 17, wherein said step of performing further comprises controlling a plurality of devices and subsystems associated with the chiller based on a plurality of parameters, wherein said HVAC control system monitors the plurality of parameters.

25. The method of claim 24, wherein the plurality of devices and subsystems includes at least about 12 devices and subsystems.

26. The method of claim 24, wherein the plurality of parameters includes at least about 14 parameters.

27. The method of claim 24, wherein controlling the plurality of devices further comprises controlling a starter motor associated with a chiller.

28. The method of claim 24, wherein controlling the plurality of devices further comprises maintaining the output water temperature of the chiller at a temperature set by a using said HVAC control system.

29. The method of claim 24, wherein the plurality of parameters includes at least one of the following: temperature, chiller water temperature, and current load placed on the starter motor of the chiller.

30. A heating, ventilation, and air conditioning (HVAC) control system for a chiller, comprising:
  a processor for configuring the HVAC control system by executing a set of Basic Input/Output System (BIOS) instructions within a BIOS; and
  means for reading a set of boot instructions that directs the processor to the flash mini-card containing a set of instructions, wherein said processor performs at least one of the set of instructions contained within the flash mini-card to control the chiller.

31. The HVAC control system of claim 30, wherein said processor does not require the use of at least one of the following devices: a hard disk, a disk controller, a card reader, or a card controller.

32. The HVAC control system of claim 30, wherein said processor further comprises means for testing for the presence of the flash mini-card associated with the HVAC control system, and wherein the BIOS resides within the flash mini-card.

33. The HVAC control system of claim 30, further comprising:
  a remote control system for remotely controlling the HVAC control system through a network.

34. The HVAC control system of claim 30, wherein said processor further comprises means for downloading from a network a second set of instructions to at least one of a plurality of flash mini-cards connected to said processor.

35. The HVAC control system of claim 30, wherein said processor continues reading the set of instructions from the at least one of the plurality of flash mini-cards, while said means for downloading receives the second set of instructions from the network.

36. The HVAC control system of claim 35, further comprising means for updating the set of instructions.

37. The HVAC control system of claim 30, wherein said processor further comprises means for controlling a plurality of devices and subsystems associated with the chiller based on a plurality of parameters, wherein the HVAC control system monitors the plurality of parameters.

38. The HVAC control system of claim 37, wherein the plurality of devices and subsystems includes at least about 12 devices and subsystems associated with the chiller.

39. The HVAC control system of claim 37, wherein the plurality of parameters includes at least about 14 parameters.

40. The HVAC control system of claim 37, wherein said means controlling the plurality of devices further comprises means for controlling a starter motor of the chiller.

41. The HVAC control system of claim 37, wherein said means for controlling the plurality of devices further comprises means for maintaining the output water temperature of the chiller at a temperature set using said HVAC controller.

42. The HVAC control system of claim 37, wherein the plurality of parameters includes at least one of the following: temperature, chiller water temperature, and current load placed on the starter motor of the chiller.

* * * * *